Patented June 7, 1938

2,119,553

UNITED STATES PATENT OFFICE 2,119,553

ANTIRUST MATERIAL

Frederick H. MacLaren, Calumet City, and Lawrence C. Brunstrum, Chicago, Ill., assignors to Standard Oil Company, Chicago, Ill., a corporation of Indiana No Drawing. Application March 31, 1937,
Serial No. 134,122

11 Claims. (Cl. 134—1)

This invention relates to new and improved compositions of matter for use as anti-rust materials.

It is an object of our invention to provide compositions of matter which adhere tenaciously to metal surfaces and are highly effective in preventing the corrosion and/or rusting thereof.

It is another object of this invention to provide compositions of matter which are superior slushing or anti-rust compounds.

Other objects and advantages of our invention will become apparent from the following description thereof. We have found that very effective corrosion and/or anti-rust properties are imparted to coating materials by the use of oil-soluble sulfonic soaps and the product obtained by the acid treatment of condensation products obtained by reacting a halogenated hydrocarbon, such as chlorinated paraffin wax with an aromatic hydrocarbon, for instance, naphthalene, in the presence of a catalyst of the aluminum chloride type. Condensation products of this type as made by the processes of one of the present inventors or by similar processes are known as "Pourex" and are described, for instance, in U. S. Patents Nos. 1,963,917, 1,963,918 and 2,057,104. Other similar condensation products can be used.

The acid treatment of "Pourex" or other similar products is preferably accomplished by the use of fuming sulfuric acid although concentrated sulfuric acid can be used. I prefer to treat with about 1 pound of 104½% sulfuric acid per gallon of "Pourex" or other similar condensation products, although one tenth to 3 pounds of acid per gallon of condensation product may be used.

The condensation product per se may be acid treated at elevated temperatures or the condensation product may be diluted in a light hydrocarbon solvent and acid treated at about room temperature. The following procedures may be followed: The condensation product may be treated at 140° F. to 150° F. with 1 pound of 104½% sulfuric acid per gallon of "Pourex" (or other similar condensation product) and the mass neutralized with ammonium hydroxide after the excess acid has settled out. The neutralized product is then dissolved in naphtha (4 to 8 volumes per volume of product), settled and/or strained free from salts and then reduced in a still using fire and steam.

The other method of acid treating the condensation product consists in diluting the "Pourex" in 3 to 6 volumes of naphtha and acid treating the diluted "Pourex" at about 80 to 100° F. with 1 pound of 104½% sulfuric acid per gallon of "Pourex". The reaction mass is then settled, neutralized and reduced as in the above first method.

We prefer to use ammonia in the neutralization step since any excess is readily removed. However, sodium hydroxide and other alkalies may be used.

In the acid treating step agitation is necessary in order to obtain good contacts. This should be effected by mechanical means or by means of an inert gas since we have found that air blowing destroys the desired properties of the acid treated "Pourex". It is believed some sort of oxidation occurs which causes this change in the acid treated "Pourex". The product obtained by acid treating "Pourex" using mechanical agitation or agitation by means of an inert gas possesses the desired metal wetting properties.

The oil soluble sulfonic acid soaps used in our compositions are preferably the so-called "mahogany soaps" or alkali metal salts of preferentially oil-soluble sulfonic acids derived from mineral oils described in the Humphrey U. S. Patent No. 1,286,179 or in any other suitable manner.

In our co-pending patent application Serial No. 78,932, filed May 9, 1936 of which the present application is a continuation in part, it was pointed out that the acid treated condensation products are more satisfactory and more effective than most prior art materials for use as slushing compounds or as a constituent in slushing compounds. We have now found that anti-rust and/or slushing compositions of which the acid treated condensation product is one of the constituents may be still further improved by incorporating therein the preferentially oil-soluble sulfonic soaps and preferably mahogany soap. While we may use mixes comprising substantially entirely acid treated "Pourex" or other similar condensation products and mahogany soap, for example mixes comprising 65 to 99% acid treated "Pourex" and 1 to 35% mahogany soap, we prefer to add various amounts of oils or waxes or both oil and wax to the mixture.

For liquid slushing compositions we have found that mixes of approximately 3 to 30% mahogany soap, 1 to 20% acid treated "Pourex" and 50 to 96% oil was very effective in providing adequate protection to the metal surfaces to which they were applied.

The consistency of the compositions can be varied to suit the need, oils of various viscosities being used to obtain anti-rust compositions of the desired fluidity. If necessary anti-rust compositions of proper viscosity may be obtained by mixing oils of high viscosity with oils of low viscosity. The following specific examples are illustrative of compositions which have been found to be very effective in protecting metal surfaces against corrosion and/or rusting.

Example I

| | |
|---|---|
| Mahogany soap | 20% |
| Cylinder stock | 53% |
| Pale paraffin oil | 25% |
| Acid treated "Pourex" | 2% |
| Saybolt universal viscosity of mix at 100° F | 1043 seconds |

Example II

| | |
|---|---|
| Mahogany soap | 11% |
| Pale paraffin oil | 87% |
| Acid treated "Pourex" | 2% |
| Saybolt universal viscosity of mix at 100° F | 111 seconds |

A product having the composition of Example II is particularly well suited for protecting highly finished metal articles, such as fishing reels, razor blades, cutlery, and the like, from rusting and fingerprint markings due to handling. It also has been found to be very effective in protecting the interior surfaces of gun barrels against after-corrosion, that is, corrosion in the gun barrel due to the corrosion effects of the products of detonation.

Under certain conditions it is better to employ anti-rust compositions which are semi-solid or solid. Under the most severe conditions of exposure, such as exposure to heavy rains, hot suns, dirt and dust, liquid anti-rust materials are not as effective as the semi-solid or solid anti-rust compositions. When an anti-rust oil is used under these conditions there is danger of it being washed off by the rain, leaving the surface exposed to rusting. Exposure to the hot sun tends to evaporate the lighter anti-rust oils and dirt and dust falling upon the oil surfaces absorbs the oil and makes it ineffective as a protecting film. For these reasons the use of semi-solid or solid anti-rust compositions (hereinafter referred to as anti-rust greases) is to be preferred to oil for protection under severe conditions.

We have found that suitable anti-rust greases may be prepared with waxes such as paraffin wax, Montan wax, carnauba wax, etc. and with petrolatums in combination with mahogany soap and acid treated "Pourex". Oil may also be used in these mixes to obtain the desired consistency. As the wax constituent we prefer to use a refined grade of petrolatum wax, for instance, one having a melting point of at least about 125° F. Another wax we may use to advantage is a refined grade of very high melting point wax known commercially as "Superla" wax or its equivalent. "Superla" wax is a "tacky" petroleum wax having a melting point of from about 140° F. to about 150° F. or above. We may also use as one of the constituents petrolatums and/or petrolatum base stocks or mixtures of each or both of these with waxes.

A suitable semi-solid anti-rust grease is one having the following formula:

| | Percent |
|---|---|
| Mahogany soap | 2 to 10 |
| Mineral oil | 25 to 55 |
| Petrolatum | 40 to 70 |
| Acid treated "Pourex" | 2 to 15 |

The oil in the above composition is preferably one having a Saybolt universal viscosity at 100° F. of about 80 to about 150 seconds and the petrolatum one having a melting point of about 108 to 115° F.

Anti-rust greases which are solid at room temperatures may be prepared by replacing all or a part of the petrolatum in the above mix with a wax such as "Superla" wax.

A suitable anti-rust grease which is solid at room temperature is one having the following composition:

| | Percent |
|---|---|
| Mahogany soap | 8 |
| Petrolatum | 65 |
| Superla wax | 17 |
| Acid treated "Pourex" | 10 |

Anti-rust greases which are solid at room temperatures are usually melted to facilitate application to the article to be protected, the melted composition being applied either by dipping the article into the molten material or by applying the molten material by means of a brush or spray. To facilitate the application of the solid anti-rust greases without heating the same, the same may be thinned, using a hydrocarbon solvent such as oleum spirits as a thinner.

The percentages of mahogany soap given herein are on an oil-free basis and the percentages of all the constituents are on a weight basis.

While we have described our invention in connection with certain specific embodiments thereof it is to be understood that these are by way of illustration only and not by way of limitation.

We claim:

1. An improved slushing composition comprising from about 1% to about 35% by weight mahogany soap and from about 65% to about 99% weight sulfuric acid treated condensation product of chlorinated wax and an aromatic hydrocarbon.

2. A corrosion resistant metal adherent composition of matter comprising from about 3% to about 30% by weight of an oil-soluble petroleum sulfonic soap, from about 1% to about 20% by weight of a condensation product of chlorinated wax and an aromatic hydrocarbon, said condensation product having been subjected to treatment with fuming sulfuric acid, and a mineral oil.

3. A slushing compound having approximately the following composition by weight:

| | Percent |
|---|---|
| Fuming sulfuric acid treated condensation product of chlorinated wax and an aromatic hydrocarbon | 1 to 20 |
| Oil-soluble sulfonic soap | 3 to 30 |
| Oil | 50 to 96 |

4. A corrosion resistant metal adherent composition of matter comprising from about 1% to about 35% by weight of an oil-soluble petroleum sulfonic soap, from about 1% to about 20% by weight of a condensation product of chlorinated wax and an aromatic hydrocarbon, said condensation product having been subjected to treatment with fuming sulfuric acid, mineral oil and a wax.

5. A slushing compound having approximately the following composition by weight:

| | Percent |
|---|---|
| Fuming sulfuric acid treated condensation product of chlorinated wax and an aromatic hydrocarbon | 2 |
| Mahogany soap | 20 |
| Lubricating oil | 78 |

6. An improved slushing composition having approximately the following composition by weight:

| | Percent |
|---|---|
| Fuming sulfuric acid treated condensation product of chlorinated wax and an aromatic hydrocarbon | 2 |
| Mahogany soap | 11 |
| Pale paraffin oil | 87 |

7. A composition of matter for use in protecting metals from corrosion comprising from about 1% to about 35% by weight of an oil-soluble sodium sulfonate obtained by the neutralization of acid sludge resulting from the sulfuric acid treatment of mineral lubricating oils, from about 1% to about 20% by weight of a fuming sulfuric acid treated condensation product of chlorinated wax and an aromatic hydrocarbon, and petrolatum.

8. A corrosion resistant metal adherent composition of matter comprising the following ingredients in about the following proportions by weight:

| | Percent |
|---|---|
| Fuming sulfuric acid treated condensation product of chlorinated wax and an aromatic hydrocarbon | 2 to 15 |
| Oil-soluble sodium sulfonate | 2 to 10 |
| Mineral oil | 25 to 55 |
| Petrolatum | 40 to 70 |

9. A composition of matter for use in protecting metals from corrosion comprising a substantial amount but less than about 35% by weight of an oil-soluble sodium sulfonate obtained by the neutralization of sulfonic acids resulting from the sulfuric acid treatment of mineral lubricating oils, up to about 20% by weight of a fuming sulfuric acid treated condensation product of chlorinated wax and an aromatic hydrocarbon, petrolatum and a petroleum wax having a melting point above 140° F.

10. A composition of matter for use in protecting metals from corrosion comprising a substantial amount but less than about 35% by weight of an oil-soluble sodium sulfonate obtained by the neutralization of sulfonic acids resulting from the sulfuric acid treatment of mineral lubricating oils, from about 1% to about 20% by weight of a fuming sulfuric acid treated condensation product of chlorinated wax and an aromatic hydrocarbon, petrolatum, a petroleum wax having a melting point above 140° F. and a volatile hydrocarbon solvent.

11. An improved slushing grease having approximately the following composition by weight:

| | Percent |
|---|---|
| Sulfuric acid treated condensation product of chlorinated wax and an aromatic hydrocarbon | 10 |
| Mahogany soap | 8 |
| Petrolatum | 65 |
| Refined wax (melting point over 140° F.) | 17 |

FREDERICK H. MacLAREN.
LAWRENCE C. BRUNSTRUM.

CERTIFICATE OF CORRECTION.

Patent No. 2,119,553. June 7, 1938.

FREDERICK H. MacLAREN, ET AL.

It is hereby certified that error appears in the printed specification of the above numbered patent requiring correction as follows: Page 1, second column, line 48, for the word "was" read were; page 2, first column, line 56, for "petrolatum" read petroleum; and that the said Letters Patent should be read with these corrections therein that the same may conform to the record of the case in the Patent Office.

Signed and sealed this 12th day of July, A. D. 1938.

(Seal)

Henry Van Arsdale,
Acting Commissioner of Patents.